United States Patent
Luo et al.

(10) Patent No.: US 9,215,077 B2
(45) Date of Patent: Dec. 15, 2015

(54) METHOD AND SYSTEM FOR SUPPORTING MULTIPLE TIME ZONES AND CHARGING METHOD AND SYSTEM IN IMS

(75) Inventors: Xujian Luo, Shenzhen (CN); Yu Zhang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 248 days.

(21) Appl. No.: 13/880,047

(22) PCT Filed: Oct. 13, 2011

(86) PCT No.: PCT/CN2011/080749
§ 371 (c)(1),
(2), (4) Date: Apr. 17, 2013

(87) PCT Pub. No.: WO2012/051913
PCT Pub. Date: Apr. 26, 2012

(65) Prior Publication Data
US 2013/0208629 A1      Aug. 15, 2013

(30) Foreign Application Priority Data
Oct. 20, 2010   (CN) .......................... 2010 1 0514373

(51) Int. Cl.
*H04L 12/16* (2006.01)
*H04Q 11/00* (2006.01)
(Continued)

(52) U.S. Cl.
CPC ........ *H04L 12/1407* (2013.01); *H04L 12/1485* (2013.01); *H04L 65/1006* (2013.01);
(Continued)

(58) Field of Classification Search
CPC .............. H04L 65/105; H04L 12/1407; H04L 12/1485; H04L 65/80; H04L 65/1006; H04L 65/1016; H04M 15/22
See application file for complete search history.

(56) References Cited

U.S. PATENT DOCUMENTS

2006/0229084 A1   10/2006  Noldus
2007/0280447 A1*  12/2007  Cai et al. ................. 379/114.03
(Continued)

FOREIGN PATENT DOCUMENTS

| CN | 1889606 A    | 1/2007 |
| CN | 101569134 A  | 10/2009 |
| EP | 1906638 A1   | 4/2008 |

OTHER PUBLICATIONS

3GPP, TS 32.299 Telecommunication Management, Charging Management, and Diameter Charging Applications, Jun. 18, 2010, Published by 3GPP, Version 9.4.0, Release 9, pp. 15-25, 42-44, 85-86, and 132.*

(Continued)

*Primary Examiner* — Shripal Khajuria
*Assistant Examiner* — Farhad Ali
(74) *Attorney, Agent, or Firm* — Neifeld IP Law, PC

(57) ABSTRACT

The disclosure provides a method for supporting multiple time zones in an IP Multimedia Subsystem (IMS). The method comprises: a Proxy Call Session Control Function (PCSCF) network element sends a Session Initiation Protocol (SIP) message including time zone information to a control layer network element exclusive of the PCSCF network element (201); after obtaining the time zone information, the control layer network element receiving the SIP message sends an SIP message including the time zone information to a service layer network element (202); and the service layer network element receives the SIP message sent from the control layer network element and obtains the time zone information included in the SIP message (203). The disclosure also provides a system for supporting multiple time zones, a charging method and a charging system in an IMS. Through the solution of the disclosure, the time zone information can be transferred to each network element above in the IMS, and local time of a user in a call can be included in a Charging Data Record (CDR), thus, the accuracy of charging is improved.

14 Claims, 12 Drawing Sheets

(51) Int. Cl.
*H04L 12/14* (2006.01)
*H04L 29/06* (2006.01)
*H04M 15/22* (2006.01)

(52) U.S. Cl.
CPC ............ *H04L65/1016* (2013.01); *H04L 65/80* (2013.01); *H04M 15/22* (2013.01); *H04M 2215/208* (2013.01)

(56) References Cited

U.S. PATENT DOCUMENTS

| | | | |
|---|---|---|---|
| 2008/0032736 A1* | 2/2008 | Bari et al. | 455/552.1 |
| 2008/0159499 A1 | 7/2008 | Cai | |
| 2008/0305811 A1* | 12/2008 | Cai et al. | 455/461 |
| 2009/0209229 A1* | 8/2009 | Cai et al. | 455/406 |
| 2010/0281151 A1* | 11/2010 | Ramankutty et al. | 709/223 |
| 2011/0078061 A1* | 3/2011 | Cai et al. | 705/30 |
| 2011/0263272 A1* | 10/2011 | Witzel et al. | 455/456.1 |
| 2012/0036529 A1* | 2/2012 | McClenny et al. | 725/33 |
| 2012/0041856 A1* | 2/2012 | Narkar | 705/34 |
| 2013/0100863 A1* | 4/2013 | Guerra et al. | 370/259 |
| 2013/0132594 A1* | 5/2013 | Boeszoermenyi et al. | 709/228 |

OTHER PUBLICATIONS

International Search Report in international application No. PCT/CN2011/080749, mailed on Jan. 19, 2012.
English Translation of the Written Opinion of the International Search Authority in international application No. PCT/CN2011/080749, mailed on Jan. 19, 2012.
Charging Data Record (CDR) parameter description Mar. 2010.
Diameter charging applications Jun. 2010.
The IMS: IP Multimedia Concepts and Services Jul. 14, 2006.
IP Multimedia Subsystem (IMS) Handbook Nov. 19, 2008.
Supplementary European Search Report in European application No. 11833819.3, mailed on Jun. 13, 2014.

* cited by examiner

METHOD AND SYSTEM FOR SUPPORTING MULTIPLE TIME ZONES AND CHARGING METHOD AND SYSTEM IN IMS

CROSS REFERENCE TO RELATED APPLICATIONS

This application is a national stage entry of PCT/CN2011/080749, filed Oct. 13, 2011, which published as WO 2012/051913 in a language other than English on Apr. 26, 2012, which claims priority to China Application No. 201010514373.2, filed Oct. 20, 2010.

TECHNICAL FIELD

The disclosure relates to the technology of 3rd Generation Partnership Project (3GPP), and more particularly to a method and a system for supporting multiple time zones, a charging method and a charging system in an IP Multimedia Subsystem (IMS).

BACKGROUND

In an IMS network architecture of the 3GPP, a core network may cover users located in different time zones in a country, for example, the condition in America; therefore, User Equipment (UE), access layer network elements (Access Network Nodes), IMS control layer network elements and service layer network elements probably are distributed in same or different time zones. Information of the time zone in which the UE is located is significant for the operation of operators from perspectives such as charging, statistics and Quality of Service (QoS) control. In current protocol standard of the 3GPP, timestamp related information included in a message of the IMS network architecture is standard time information of Universal Time Coordinated (UTC) format.

From the perspective of charging through which operators can earn a profit, different time zones probably correspond to different configurable rates, or periods with preferential rate probably are set according to time zones; therefore, the information of the time zone in which the UE is located is significant for operators from perspectives such as charging and statistics.

A charging system defined in the current 3GPP includes two parts, namely, offline charging and online charging.

The offline charging is used for reflecting charging and statistics information in near real-time; FIG. 1 shows constitutes of an offline charging function entity in an IMS and the relationship there-between.

Charging Trigger Function (CTF) is embedded in each network element of the 3GPP IMS, including access layer network elements, control layer network elements and service layer network elements, with the main purpose of collecting charging information according to the monitored use of network resources and sending the information to a Charging Data Function (CDF) through an RF interface (Offline Charging Reference Point); the main function of the CDF is to receive an Accounting Request (ACR) sent from the CTF to construct a Charging Data Record (CDR), and to send the CDR to a Charging Gateway Function (CGF) through a Ga interface; the main function of the CGF is to store and manage the CDR received from the CDF and to send the CDR file to a Billing Domain (BD) through a Bi interface.

The online charging is used for performing online credit control and statistics information report of network resources used by the UE in real time. As shown in FIG. 2, an Online Charing System (OCS) is connected with a BD and a Serving Call Session Control Function (SCSCF), and is used for interacting Credit Control Request (CCR) information/Credit Control Acknowledge (CCA) information with an IMS network element through an Ro interface, wherein the IMS network element includes a Multimedia Resource Function Controller (MRFC) and an Application Server (AS).

3GPP TS32.299 defines relevant standards of offline, online Diameter messages ACR/CCR; TS32.298 defines relevant standards of the CDR. The CDR, containing calling and called numbers, service delivery start time stamp, service delivery end time stamp and other fields, is key information for charging calls. A billing System (BS) generally computes fees according to the call time (service delivery time stamp) of a user. The time information is extracted from two Attribute Value Pairs (AVPs) in the ACR, including Session Initiation Protocol Request Timestamp (SIP-Request-Timestamp) and SIP Response Timestamp (SIP-Response-Timestamp). All the information is of Time type, indicating the number of seconds of UTC time format since Jan. 1, 1900.

From the above analysis, it can be known that the information of the time zone in which the UE is located cannot be acquired from current 3GPP standard definitions; such a bill has defects in many aspects such as user charge, bill query, account settlement and account check, for example, when a user is charged in the periods with preferential rate, it is needed to perform preferential computation according to the local time of the user; and errors will occur in the information about user communication time in the statistics information, causing reduction of customer satisfaction and influencing revenue of operators.

SUMMARY

In view of the above, the main purpose of the disclosure is to provide a method and a system for supporting multiple time zones in an IMS, which can transfer time zone information to each network element in the IMS so that each network element can obtain the time zone information.

Another purpose of the disclosure is to provide a charging method and a charging system in an IMS, which can include local time of a user in a call in a CDR, thereby improving the accuracy of charging, reducing the probability of user complaints and reducing the revenue loss of operators.

In order to achieve the purpose above, the technical scheme of the disclosure is realized as follows.

The disclosure provides a method for supporting multiple time zones in an IMS, which includes:

sending, by a Proxy Call Session Control Function (PCSCF) network element, a Session Initiation Protocol (SIP) message including time zone information to a control layer network element exclusive of the PCSCF network element;

after obtaining the time zone information, sending, by the control layer network element receiving the SIP message, an SIP message including the time zone information to a service layer network element; and receiving, by the service layer network element, the SIP message sent from the control layer network element, and obtaining the time zone information included in the SIP message.

In the scheme above, the sending, by a PCSCF network element, an SIP message including time zone information to a control layer network element exclusive of the PCSCF network element may include:

in the condition that the PCSCF network element trusts information reported from a User Equipment (UE), when the UE reports time zone information, sending, by the PCSCF network element, an SIP message including the time zone information reported from the UE to the control layer network element exclusive of the PCSCF network element; when the UE does not report time zone information and an access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element;

in the condition that the PCSCF network element does not trust information reported from the UE, when the access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element.

In the scheme above, the including time zone information may specifically include: adding the time zone information into a P-Access-Network-Info (PANI) header of the sent SIP message.

In the scheme above, an access layer network element providing time zone information may specifically include: when a session is established or released, reporting, by the access layer network element, obtained time zone information of the UE to the PCSCF network element through a Policy and Charging Control (PCC) architecture.

The disclosure provides a system for supporting multiple time zones in IP Multimedia Subsystem (IMS), which includes: a Proxy Call Session Control Function (PCSCF) network element, a control layer network element exclusive of the PCSCF network element, and a service layer network element; wherein the PCSCF network element is configured to send a Session Initiation Protocol (SIP) message including time zone information to the control layer network element;

the control layer network element is configured to receive the SIP message sent from the PCSCF network element and to send an SIP message including the time zone information to the service layer network element after obtaining the time zone information;

the service layer network element is configured to receive the SIP message sent from the control layer network element and to obtain the time zone information included in the SIP message.

In the scheme above, the system may further include: a User Equipment (UE), which is configured to report time zone information to the PCSCF network element; and an access layer network element, which is configured to provide time zone information or location information of the UE to the PCSCF network element.

In the scheme above, the PCSCF network element may be specifically configured: in the condition that the PCSCF network element trusts information reported from the UE, when the UE reports time zone information, to send an SIP message including the time zone information reported from the UE to the control layer network element exclusive of the PCSCF network element; when the UE does not report time zone information and the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element;

in the condition that the PCSCF network element does not trust information reported from the UE, when the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element.

The disclosure provides a charging method in an IP Multimedia Subsystem (IMS), which includes: sending, by a Proxy Call Session Control Function (PCSCF) network element, a Session Initiation Protocol (SIP) message including time zone information to a control layer network element exclusive of the PCSCF network element;

after obtaining the time zone information, sending, by the control layer network element receiving the SIP message, an SIP message including the time zone information to a service layer network element;

receiving, by the service layer network element, the SIP message sent from the control layer network element, and obtaining the time zone information included in the SIP message;

sending, by each network element obtaining the time zone information, a charging request message including the time zone information to a charging entity;

performing charging, by the charging entity, according to the charging request message including the time zone information sent from each network element.

In the scheme above, the sending, by a PCSCF network element, an SIP message including time zone information to a control layer network element exclusive of the PCSCF network element may include:

in the condition that the PCSCF network element trusts information reported from a User Equipment (UE), when the UE reports time zone information, sending, by the PCSCF network element, an SIP message including the time zone information reported from the UE to the control layer network element exclusive of the PCSCF network element; when the UE does not report time zone information and an access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element;

in the condition that the PCSCF network element does not trust information reported from the UE, when the access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element.

In the scheme above, the sending, by each network element obtaining the time zone information, a charging request message including the time zone information to a charging entity may include: in an offline charging system, sending, by the service layer network element and the control layer network element including the PCSCF network element which obtain the time zone information, an Accounting Request (ACR) message including the time zone information to a Charging Data Function (CDF); in an online charging system, sending, by the service layer network element and the control layer network element exclusive of the PCSCF network element which obtain the time zone information, a Credit Control Request (CCR) including the time zone information to an Online Charging System (OCS).

In the scheme above, the performing charging, by the charging entity, according to the charging request message including the time zone information sent from each network element may include: in an offline charging system, obtaining, by the charging entity, the time zone information from the charging request message sent from each network element, and setting a time field of a Charging Data Record (CDR) corresponding to each network element to contain valid information of local time of the UE, that is, UTC Time of UE+Time Zone Information, in conjunction with SIP-Request-Timestamp Attribute Value Pairs (SIP-Request-Timestamp AVP) and SIP-Response-Timestamp AVP (SIP-Response-Timestamp AVP) of Universal Time Coordinated (UTC) time format; in an online charging system, obtaining, by the charging entity, valid information of local time of the UE according to the charging request message including the time zone information sent from each network element and performing online credit control and statistics according to the valid information.

The disclosure provides a charging system in an IP Multimedia Subsystem (IMS), which includes: a Proxy Call Session Control Function (PCSCF) network element, a control layer network element exclusive of the PCSCF network element, a service layer network element and a charging entity; wherein the PCSCF network element is configured to send a Session Initiation Protocol (SIP) message including time zone information to the control layer network element and to send a charging request message including the time zone information to the charging entity in an offline charging system;

the control layer network element is configured to receive the SIP message sent from the PCSCF network element, to send an SIP message including the time zone information to the service layer network element after obtaining the time zone information, and to send a charging request message including the time zone information to the charging entity;

the service layer network element is configured to receive the SIP message sent from the control layer network element, to obtain the time zone information included in the SIP message, and to send a charging request message including the time zone information to the charging entity; and the charging entity is configured to perform charging according to the charging request message sent from each network element.

In the scheme above, the PCSCF network element may be specifically configured: in the condition that the PCSCF network element trusts information reported from a User Equipment (UE), when the UE reports time zone information, to send an SIP message including the time zone information reported from the UE to the control layer network element exclusive of the PCSCF network element; when the UE does not report time zone information and the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element;

in the condition that the PCSCF network element does not trust information reported from the UE, when the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element.

In the scheme above, the charging entity may include: a Charging Data Function (CDF) in an offline charging system, or an Online Charging System (OCS) in an online charging system;

the charging request message may include an Accounting Request (ACR) message in the offline charging system or a Credit Control Request (CCR) message in the online charging system.

With the method and system for supporting multiple time zones and the charging method and system in an IMS provided by the disclosure, the PCSCF network element sends an SIP message including time zone information to the control layer network element exclusive of the PCSCF network element itself; after obtaining the time zone information, the control layer network element receiving the SIP message sends an SIP message including the time zone information to the service layer network element; then the service layer network element receives the SIP message sent from the control layer network element and obtains the time zone information included in the SIP message; in this way, the time zone information can be transferred to each network element in the IMS so that each network can obtain the time zone information, and local time of a user in a call can be included in a CDR, thus, the accuracy of charging is improved, the probability of user complaints is reduced and the revenue loss of operators is reduced.

DETAILED DESCRIPTION

The basic concept of the disclosure is that: a PCSCF network element sends an SIP message including time zone information to a control layer network element exclusive of the PCSCF network element itself; the control layer network element receiving the SIP message sends an SIP message including the time zone information to a service layer network element.

The disclosure is described below in further detail through the drawings and specific embodiments.

Figure 1:
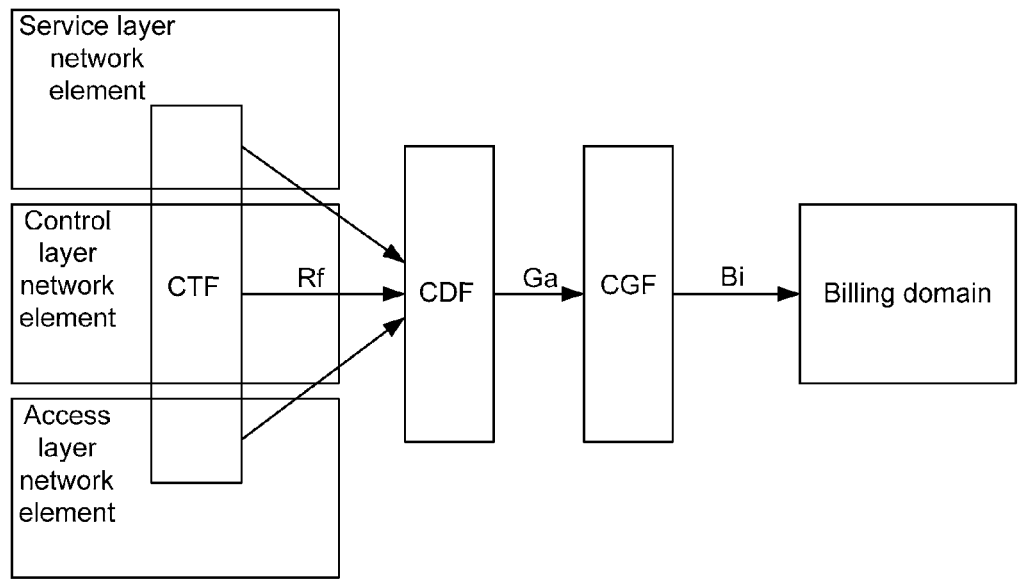
FIG. 1 shows a structure diagram of an offline charging function entity in an existing 3GPP network.
Figure 2:
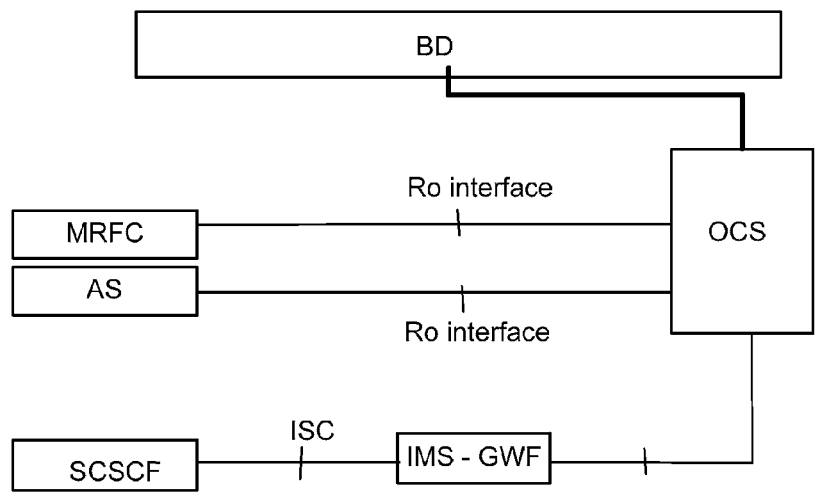
FIG. 2 shows a logic structure diagram of online charging in an existing 3GPP IMS network.
Figure 3:
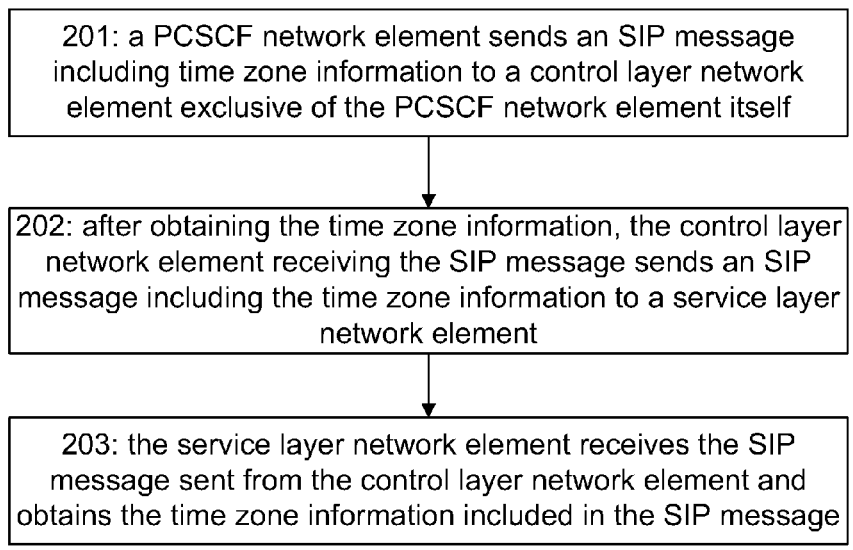
FIG. 3 shows a flowchart of a method for supporting multiple time zones in an IMS according to the disclosure.

A method for supporting multiple time zones in an IMS according to the disclosure, as shown in FIG. 3, includes the following steps:

Step 201: a PCSCF network element sends an SIP message including time zone information to a control layer network element exclusive of the PCSCF network element itself.

Specifically, in the condition that the PCSCF network element trusts information reported from a UE according to configuration:

when the UE reports time zone information, the PCSCF network element sends an SIP message including the time zone information reported from the UE to the control layer network element exclusive of the PCSCF network element itself;

when the UE does not report time zone information, if an access layer network element provides time zone information, the PCSCF network element sends an SIP message including the time zone information provided by the access layer network element to the control layer network element exclusive of the PCSCF network element itself; if the access layer network element does not provide time zone information, the PCSCF network element determines time zone information of the UE, and sends an SIP message including the determined time zone information to the control layer network element exclusive of the PCSCF network element itself; wherein the PCSCF network element determining time zone information of the UE may include: mapping out corresponding time zone information by the PCSCF network element according to location information of the UE provided by the access layer network element;

in the condition that the PCSCF network element does not trust information reported from the UE according to configuration, even though the PCSCF network element receives the time zone information reported from the UE, the PCSCF network element still replaces the time zone information reported from the UE with time zone information provided by the access layer network element or time zone information determined by the PCSCF network element itself, which specifically includes:

in the condition that the PCSCF network element does not trust the information reported from the UE according to configuration, when the access layer network element provides time zone information, the PCSCF network element sends an SIP message including the time zone information provided by the access layer network element to the control layer network element exclusive of the PCSCF network element itself; when the access layer network element does not provide time zone information, the PCSCF network element determines time zone information of the UE, and sends an SIP message including the determined time zone information to the control layer network element exclusive of the PCSCF network element itself; wherein the PCSCF network element determining time zone information of the UE may include: mapping out corresponding time zone information by the PCSCF network element according to location information of the UE provided by the access layer network element.

In the scheme above, the including the time zone information generally refers to: adding the time zone information into a P-Access-Network-Info (PANI) header of the sent SIP message; the adding the time zone information generally refers to: adding a time zone information field into an access information (access-info) part of the PANI header and adding the time zone information into the time zone information field.

Here, the access layer network element includes: PS domain/Evolved Packet Core (EPC) network element which 3GPP-UTRAN/EUTRAN accesses, Session Border Controller (SBC), Access Gateway Control Function (AGCF) and other network elements; the EPC network element includes Policy and Charging Rules Function (PCRF), Serving-Gateway (S-GW), Packet-Gateway (P-GW), Mobility Management Entity (MME) and the like.

The control layer network element exclusive of the PCSCF network element may be SCSCF, Interrogating CSCF (ICSCF), Breakout Gateway Control Function (BGCF), Media Gateway Control Function (MGCF) and other network elements.

Step 202: after obtaining the time zone information, the control layer network element receiving the SIP message sends an SIP message including the time zone information to a service layer network element.

Here, the sending an SIP message including time zone information to a service layer network element generally refers to: the SIP message sent to the service layer network element includes a PAM header added with the time zone information, wherein the service layer network element generally refers to an Application Server (AS).

Step 203: the service layer network element receives the SIP message sent from the control layer network element and obtains the time zone information included in the SIP message.

Here, the obtaining the time zone information generally refers to: obtaining the time zone information added in the PAM header included in the SIP message.

Through the above steps 201 to 202, the service layer network element in the IMS obtains the time zone information of the UE, thus the purpose of supporting multiple time zones in the IMS can be achieved.

Figure 4:
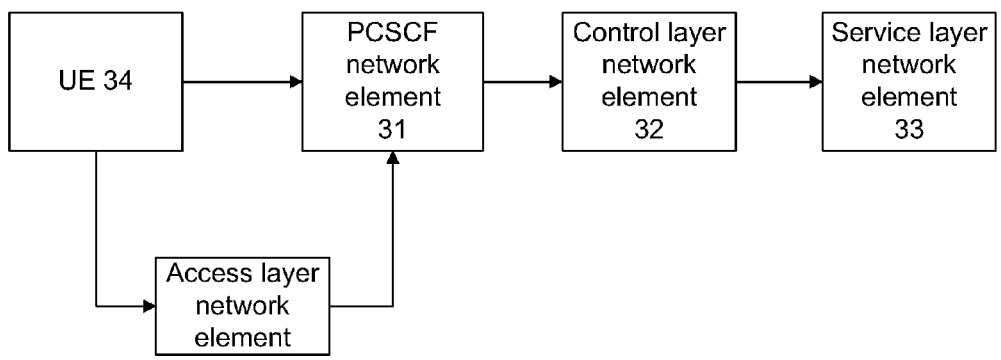
FIG. 4 shows a structure diagram of a system for supporting multiple time zones in an IMS according to the disclosure.

Based on the method above, the disclosure also provides a system for supporting multiple time zones in an IMS; as shown in FIG. 4, the system includes: a PCSCF network element 31, a control layer network element 32 exclusive of the PCSCF network element, and a service layer network element 33, wherein the PCSCF network element 31 is configured to send an SIP message including time zone information to the control layer network element 32;

the control layer network element 32 is configured to receive the SIP message sent from the PCSCF network element 31 and to send an SIP message including the time zone information to the service layer network element 33 after obtaining the time zone information;

the service layer network element 33 is configured to receive the SIP message sent from the control layer network element and to obtain the time zone information included in the SIP message.

Further, the system includes: a UE 34, which is configured to report time zone information to the PCSCF network element 31;

Further, the system includes: an access layer network element, which is configured to provide time zone information or location information of the UE to the PCSCF network element 31.

The step that the PCSCF network element 31 sends an SIP message including time zone information to the control layer network element 32 specifically includes:

in the condition that the PCSCF network element 31 trusts information reported from the UE 34 according to configuration:

when the UE 34 reports time zone information, the PCSCF network element 31 sends an SIP message including the time zone information reported from the UE 34 to the control layer network element 32;

when the UE 34 does not report time zone information, if the access layer network element provides time zone information, the PCSCF network element 31 sends an SIP message including the time zone information provided by the access layer network element to the control layer network element 32; if the access layer network element does not provide time zone information, the PCSCF network element 31 determines time zone information of the UE 34, and sends an SIP message including the determined time zone information to the control layer network element 32; wherein the PCSCF network element 31 determining time zone information of the UE 34 may include: mapping out corresponding time zone information by the PCSCF network element 31 according to location information of the UE 34 provided by the access layer network element;

in the condition that the PCSCF network element 31 does not trust information reported from the UE 31 according to configuration, even though the PCSCF network element 31 receives the time zone information reported from the UE 34, the PCSCF network element 31 still replaces the time zone information reported from the UE 34 with time zone information provided by the access layer network element or time zone information determined by the PCSCF network element 31 itself, which specifically includes:

in the condition that the PCSCF network element 31 does not trust the information reported from the UE 34 according to configuration, when the access layer network element provides time zone information, the PCSCF network element 31 sends an SIP message including the time zone information provided by the access layer network element to the control layer network element 32; when the access layer network element does not provide time zone information, the PCSCF network element 31 determines time zone information of the UE 34, and sends an SIP message including the determined time zone information to the control layer network element 32 exclusive of the PCSCF network element itself; wherein the PCSCF network element 31 determining time zone information of the UE 34 may include: mapping out corresponding time zone information by the PCSCF network element 31 according to location information of the UE 34 provided by the access layer network element.

In the scheme above, the including the time zone information generally refers to: adding the time zone information into a PAM header of the sent SIP message; the adding the time zone information generally refers to: adding a time zone information field into an access information part of the PAM header and adding the time zone information into the time zone information field.

The step that the service layer network element 33 obtains the time zone information included in the SIP message specifically includes: the service layer network element 33 obtains the time zone information added in the PAM header included in the SIP message.

Figure 5:
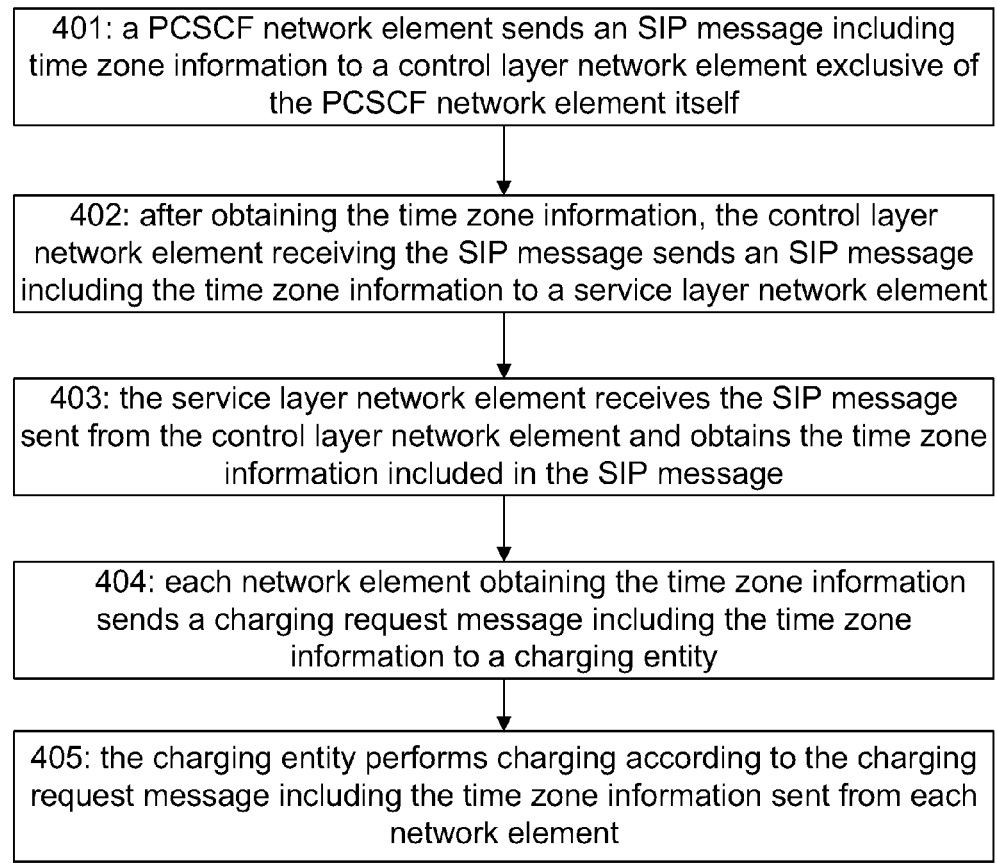
FIG. 5 shows a flowchart of a charging method in an IMS according to the disclosure.

Based on the method above, the disclosure also provides a charging method in an IMS; as shown in FIG. 5, the method includes the following steps:

Step 401: a PCSCF network element sends an SIP message including time zone information to a control layer network element exclusive of the PCSCF network element itself.

Specifically, in the condition that the PCSCF network element trusts information reported from a UE according to configuration:

when the UE reports time zone information, the PCSCF network element sends an SIP message including the time zone information reported from the UE to the control layer network element exclusive of the PCSCF network element itself;

when the UE does not report time zone information, if an access layer network element provides time zone information, the PCSCF network element sends an SIP message including the time zone information provided by the access layer network element to the control layer network element exclusive of the PCSCF network element itself; if the access layer network element does not provide time zone information, the PCSCF network element determines time zone information of the UE, and sends an SIP message including the determined time zone information to the control layer network element exclusive of the PCSCF network element itself; wherein the PCSCF network element determining time zone information of the UE may include: mapping out corresponding time zone information by the PCSCF network element according to location information of the UE provided by the access layer network element;

in the condition that the PCSCF network element does not trust information reported from the UE according to configuration, even though the PCSCF network element receives the time zone information reported from the UE, the PCSCF network element still replaces the time zone information reported from the UE with time zone information provided by the access layer network element or time zone information determined by the PCSCF network element itself, which specifically includes:

in the condition that the PCSCF network element does not trust the information reported from the UE according to configuration, when the access layer network element provides time zone information, the PCSCF network element sends an SIP message including the time zone information provided by the access layer network element to the control layer network element exclusive of the PCSCF network element itself; when the access layer network element does not provide time zone information, the PCSCF network element determines time zone information of the UE, and sends an SIP message including the determined time zone information to the control layer network element exclusive of the PCSCF network element itself; wherein the PCSCF network element determining time zone information of the UE may include: mapping out corresponding time zone information by the PCSCF network element according to location information of the UE provided by the access layer network element.

In the scheme above, the including the time zone information generally refers to: adding the time zone information into a PANI header of the sent SIP message; the adding the time zone information generally refers to: adding a time zone information field into an access information part of the PANI header and adding the time zone information into the time zone information field.

Here, the access layer network element includes: PS domain/EPC network element which 3GPP-UTRAN/EU-TRAN accesses, SBC, AGCF and other network elements.

The control layer network element exclusive of the PCSCF network element may be SCSCF, ICSCF, BGCF, MGCF and other network elements.

Step 402: after obtaining the time zone information, the control layer network element receiving the SIP message sends an SIP message including the time zone information to a service layer network element.

Here, the sending an SIP message including the time zone information to a service layer network element generally refers to: the SIP message sent to the service layer network element includes a PANI header added with the time zone information, wherein the service layer network element generally refers to an AS.

Step 403: the service layer network element receives the SIP message sent from the control layer network element and obtains the time zone information included in the SIP message.

Here, the obtaining the time zone information generally refers to: obtaining the time zone information added in the PANI header included in the SIP message.

Step 404: each network element obtaining the time zone information sends a charging request message including the time zone information to a charging entity.

Specifically, in an offline charging system, the service layer network element and the control layer network element including the PCSCF network element, which obtain the time zone information, send an ACR message including the time zone information to a CDF; in an online charging system, the service layer network element and the control layer network element exclusive of the PCSCF network element, which obtain the time zone information, send a CCR message including the time zone information to an OCS; the control layer network element exclusive of the PCSCF network element includes SCSCF and MRCF network elements.

The sending an ACR message including the time zone information generally includes: adding the time zone information into an Access-Network-Information (ANI) AVP, and including the ANI AVP in the ACR message, which is called an ANI mode; or, adding a new time zone AVP, adding the time zone information into the new time zone AVP, and including the time zone AVP in the ACR message, which is called a TZ mode.

The sending a CCR message including the time zone information generally includes: adding the time zone information into an ANI AVP, and including the ANI AVP in the CCR message; or, adding a new time zone AVP, adding the time zone information into the new time zone AVP, and including the time zone AVP in the CCR message.

Step 405: the charging entity performs charging according to the charging request message including the time zone information sent from each network element.

Specifically, in the offline charging system, the charging entity obtains the time zone information from the charging request message sent from each network element, and sets the time field of a CDR corresponding to each network element to contain valid information of local time of the UE, that is, UTC Time+Time Zone Information of the UE, in conjunction with SIP-Request-Timestamp AVP and SIP-Response-Timestamp AVP of UTC time format; in the online charging system, the charging entity obtains valid information of local time of the UE according to the charging request message including the time zone information sent from each network element and performs online credit control and statistics according to the valid information.

Figure 6:
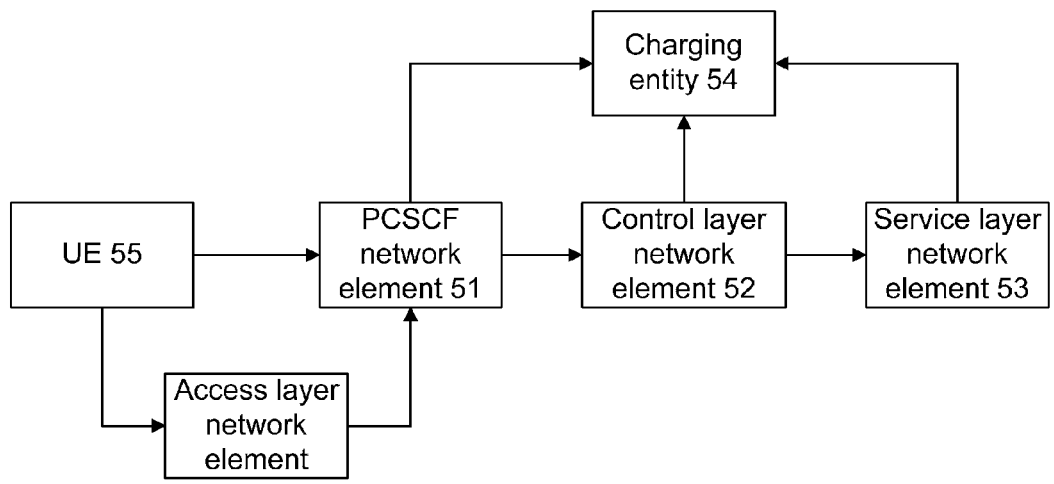
FIG. 6 shows a structure diagram of a charging system in an IMS according to the disclosure.

In order to implement the method above, the disclosure also provides a charging system in an IMS; as shown in FIG. 6, the system includes: a PCSCF network element 51, a control layer network element 52 exclusive of the PCSCF network element, a service layer network element 53 and a charging entity 54; wherein the PCSCF network element 51 is configured to send an SIP message including time zone information to the control layer network element 52 and to send a charging request message including the time zone information to the charging entity 54 in an offline charging system;

the control layer network element 52 is configured to receive the SIP message sent from the PCSCF network element 51, to send an SIP message including the time zone information to the service layer network element 53 after obtaining the time zone information, and to send a charging request message including the time zone information to the charging entity 54;

the service layer network element 53 is configured to receive the SIP message sent from the control layer network element, to obtain the time zone information included in the SIP message, and to send a charging request message including the time zone information to the charging entity 54; and the charging entity 54 is configured to perform charging according to the charging request message sent from each network element.

Specifically, during offline charging, the charging entity 54 obtains the time zone information from the charging request message sent from each network element, and sets the time field of a CDR corresponding to each network element to contain the valid information of UE local time in conjunction with SIP-Request-Timestamp AVP and SIP-Response-Timestamp AVP of UTC time format; during online charging, the charging entity 54 obtains valid information of the UE local time according to the charging request message including the time zone information sent from each network element, and performs online credit control and statistics according to the valid information.

The above charging entity 54 includes: a CDF in an offline charging system, or an OCS in an online charging system; the above charging request message includes an ACR message in the offline charging system or a CCR message in the online charging system.

When the charging request message is an ACR message, the sending the charging request message including the time zone information generally includes: adding the time zone information into an ANI AVP, and including the ANI AVP in the ACR message; or, adding a new time zone AVP, adding the time zone information into the new time zone AVP, and including the time zone AVP in the ACR message.

Further, the system includes a UE 55, which is configured to report time zone information to the PCSCF network element 51.

Further, the system also includes an access layer network element, which is configured to provide time zone information or location information of the UE 55 to the PCSCF network element 51.

The step that the PCSCF network element 51 sends an SIP message including time zone information to the control layer network element 52 specifically includes:

in the condition that the PCSCF network element 51 trusts information reported from the UE 55 according to configuration:

when the UE 55 reports time zone information, the PCSCF network element 51 sends an SIP message including the time zone information reported from the UE 55 to the control layer network element 52;

when the UE 55 does not report time zone information, if the access layer network element provides time zone information, the PCSCF network element 51 sends an SIP message including the time zone information provided by the access layer network element to the control layer network element 52; if the access layer network element does not provide time zone information, the PCSCF network element 51 determines time zone information of the UE 55, and sends an SIP message including the determined time zone information to the control layer network element 52; wherein the PCSCF network element 51 determining time zone information of the UE 55 may include: mapping out corresponding time zone information by the PCSCF network element 51 according to location information of the UE 55 provided by the access layer network element;

in the condition that the PCSCF network element 51 does not trust information reported from the UE 55 according to configuration, even though the PCSCF network element 51 receives the time zone information reported from the UE 55, the PCSCF network element 51 still replaces the time zone information reported from the UE 55 with time zone information provided by the access layer network element or time zone information determined by the PCSCF network element 51 itself, which specifically includes:

in the condition that the PCSCF network element 51 does not trust the information reported from the UE 55 according to configuration, when the access layer network element provides time zone information, the PCSCF network element 51 sends an SIP message including the time zone information provided by the access layer network element to the control layer network element 52; when the access layer network element does not provide time zone information, the PCSCF network element 51 determines time zone information of the UE 55, and sends an SIP message including the determined time zone information to the control layer network element 52 exclusive of the PCSCF network element itself; wherein the PCSCF network element 51 determining time zone information of the UE 55 may include: mapping out corresponding time zone information by the PCSCF network element 51 according to location information of the UE 55 provided by the access layer network element.

In the scheme above, the including the time zone information generally refers to: adding the time zone information into a PANI header of the sent SIP message; the adding the time zone information generally refers to: adding a time zone information field into an access information part of the PANI header and adding the time zone information into the time zone information field.

The step that the service layer network element 53 obtains the time zone information included in the SIP message specifically includes: the service layer network element 53 obtains the time zone information added in the PANI header included in the SIP message.

The implementation and principle of the method of the disclosure is described below in detail in conjunction with specific embodiments.

Embodiment 1

Figure 7:
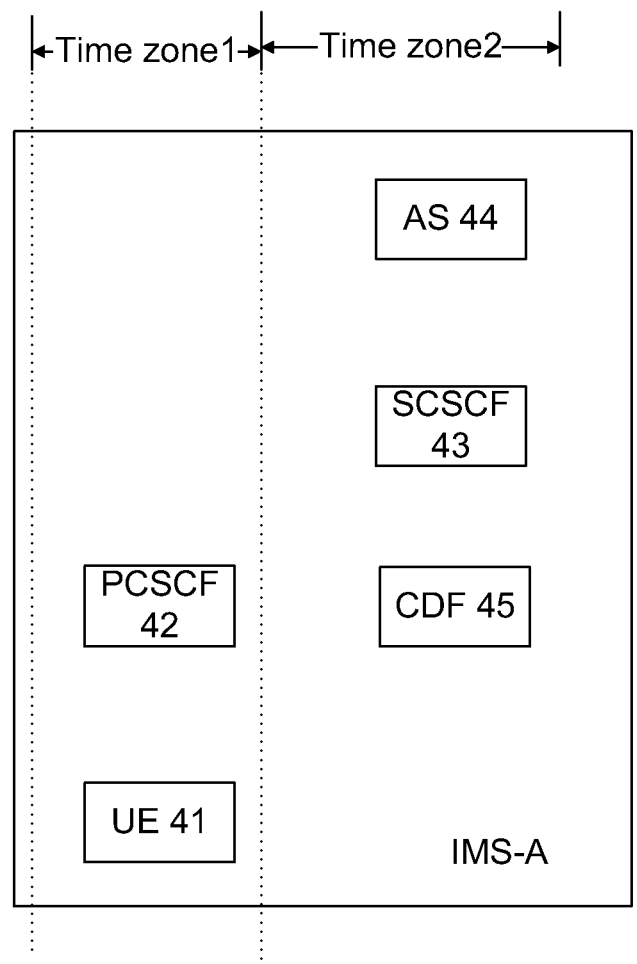
FIG. 7 shows a diagram of a network architecture for Embodiment 1, Embodiment 2 and Embodiment 3 of the disclosure.
Figure 8:
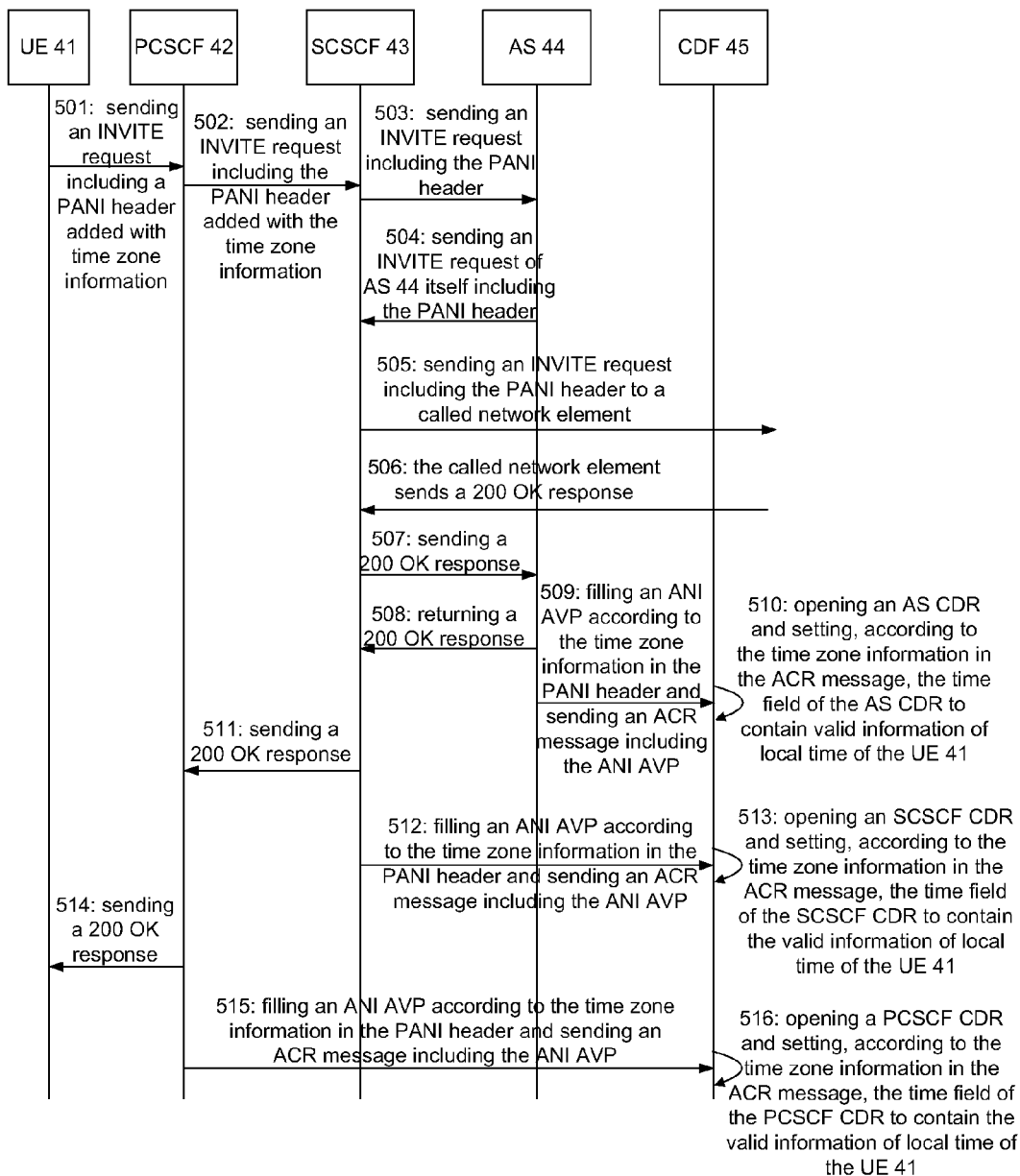
FIG. 8 shows a flowchart of a method for supporting multiple time zones and performing offline charging in an IMS when a PCSCF network element trusts information reported from UE41 according to Embodiment 1 of the disclosure.

In the network architecture shown in FIG. 7 in this embodiment, a UE 41 reports time zone information; a PCSCF network element 42 trusts the information reported from the UE 41 according to configuration; time zone1≠time zone2; a charging method in an IMS is implemented when the time zone information is included by a calling side (IMS-A) using the ANI method. As shown in FIG. 8, the method includes the following steps:

Step 501: the UE 41 sends an INVITE request including a PANI header added with the time zone information to the PCSCF network element 42.

Specifically, the UE 41 extends the PANI header, adds a time zone information field into an access information part of the PANI header, adds the information of the time zone in which the UE 41 is located into the time zone information field, and then the INVITE request including the PANI header is sent to the PCSCF network element 42.

Step 502: after receiving the INVITE request, the PCSCF network element 42 sends an INVITE request including the PANI header added with the time zone information to an SCSCF network element 43.

Step 503: after receiving the INVITE request including the PANI header sent from the PCSCF network element 42, the SCSCF network element 43 sends an INVITE request including the PANI header to a subscribed AS 44.

Step 504: after receiving the INVITE request including the PANI header sent from the SCSCF network element 43, the AS 44 sends an INVITE request of itself to the SCSCF network element 43, which includes the PANI header.

Step 505: the SCSCF network element 43 sends an INVITE request including the PANI header to a called network element.

Step 506: the called network element sends a 200 OK response to the SCSCF network element 43.

Step 507: the SCSCF network element 43 sends a 200 OK response to the AS 44.

Step 508: the AS 44 returns a 200 OK response to the SCSCF network element 43.

Step 509: the AS 44 fills an ANI AVP according to the time zone information in the PANI header and sends an ACR message including the ANI AVP to a CDF network element 45.

Step 510: after receiving the ACR message sent from the AS 44, the CDF network element 45 opens an AS CDR and sets, according to the time zone information in the ACR message, the time field of the AS CDR to contain valid information of local time of the UE 41, that is, UTC time of UE41+time zone information.

Step 511: the SCSCF network element 43 sends a 200 OK response to the PCSCF network element 42.

Step 512: the SCSCF network element 43 fills an ANI AVP according to the time zone information in the PANI header and sends an ACR message including the ANI AVP to the CDF network element 45.

Step 513: after receiving the ACR message sent from the SCSCF network element 43, the CDF network element 45 opens an SCSCF CDR and sets, according to the time zone information in the ACR message, the time field of the SCSCF CDR to contain the valid information of local time of the UE 41.

Step 514: the PCSCF network element 42 sends a 200 OK response to the UE 41.

Step 515: the PCSCF network element 42 fills an ANI AVP according to the time zone information in the PANI header and sends an ACR message including the ANI AVP to the CDF network element 45.

Step 516: after receiving the ACR message sent from the PCSCF network element 42, the CDF network element 45 opens a PCSCF CDR and sets, according to the time zone information in the ACR message, the time field of the PCSCF CDR to contain the valid information of local time of the UE 41.

Embodiment 2

Figure 9:
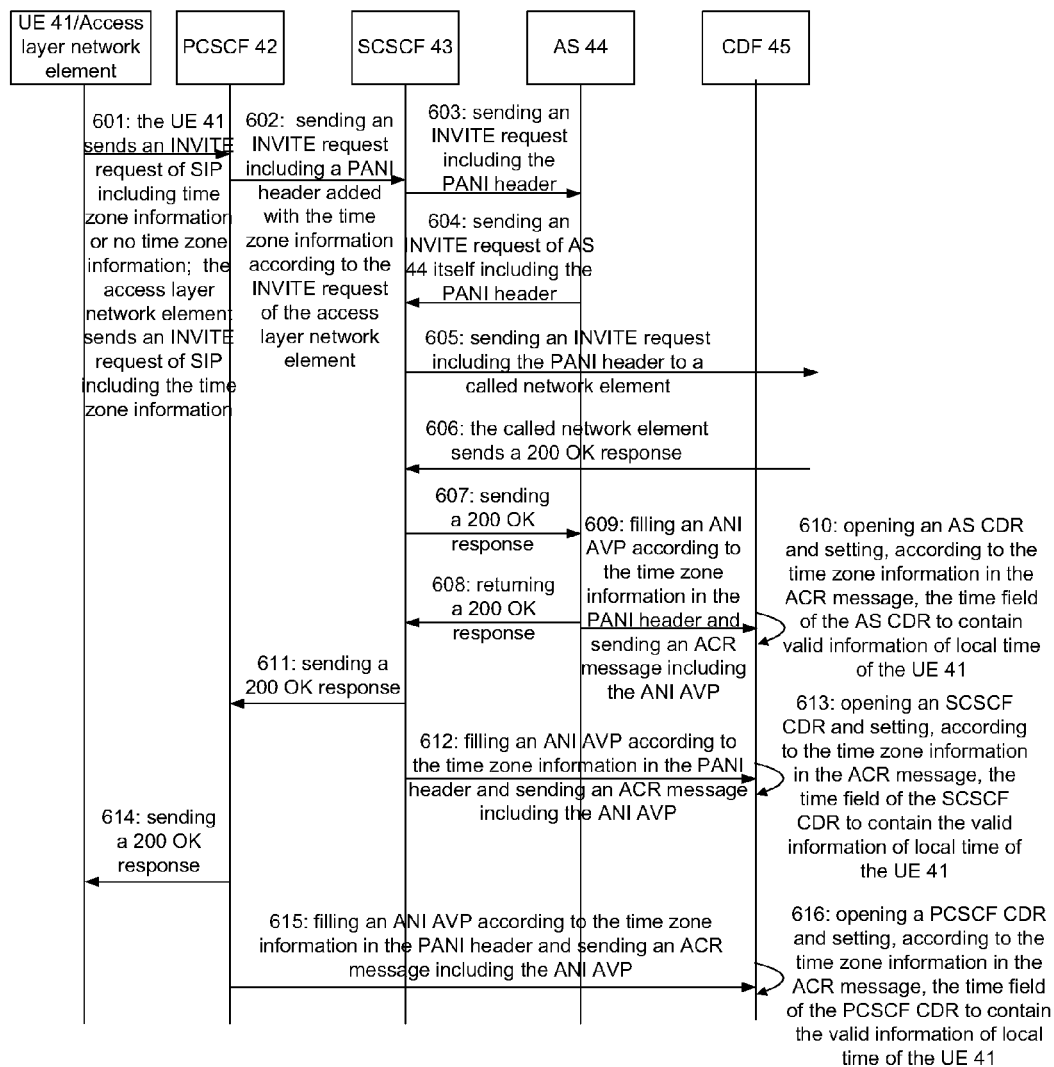
FIG. 9 shows a flowchart of a method for supporting multiple time zones and performing offline charging in an IMS when a PCSCF network element does not trust information reported from UE41 according to Embodiment 2 of the disclosure.

In the network architecture shown in FIG. 7 in this embodiment, a UE 41 reports or does not report time zone information; an access layer network element provides time zone information to a PCSCF network element 42, and the PCSCF network element 42 does not trust the information reported from the UE 41; then, a charging method in an IMS is implemented during offline charging; as shown in FIG. 9, the method includes the following steps:

Step 601: the UE 41 sends an INVITE request of SIP including the time zone information or no time zone information to the PCSCF network element 42; the access layer network element sends an INVITE request of SIP including the time zone information to the PCSCF network element 42.

In this step, the UE 41 or the access layer network element sending the INVITE request including the time zone information specifically includes: the UE 41 or the access layer network element sends the INVITE request including a PANI header added with the time zone information.

Step 602: the PCSCF network element 42 sends an INVITE request including the PANI header added with the time zone information to an SCSCF network element 43 according to the INVITE request of the access layer network element.

In this step, since the PCSCF network element 42 does not trust the information reported from the UE 41 according to configuration, when the INVITE request of SIP sent from the UE 41 includes the time zone information, the PCSCF network element 42 replaces the PANI header in the INVITE request from the UE 41 with the PANI header containing the time zone information included in the INVITE request from the access layer network element, and sends an INVITE request including the replaced PANI header to the SCSCF network element 43; when the INVITE request of SIP sent from the UE 41 does not include the time zone information, the PCSCF network element 42 sends an INVITE request including the PANI header containing the time zone information obtained from the INVITE request of the access layer network element to the SCSCF network element 43.

Step 603: after receiving the INVITE request including the PANI header sent from the PCSCF network element 42, the SCSCF network element 43 sends an INVITE request including the PANI header to a subscribed AS 44.

Step 604: after receiving the INVITE request including the PANI header sent from the SCSCF network element 43, the AS 44 sends an INVITE request of itself to the SCSCF network element 43, which includes the PANI header.

Step 605: the SCSCF network element 43 sends an INVITE request including the PANI header to a called network element.

Step 606: the called network element sends a 200 OK response to the SCSCF network element 43.

Step 607: the SCSCF network element 43 sends a 200 OK response to the AS 44.

Step 608: the AS 44 returns a 200 OK response to the SCSCF network element 43.

Step 609: the AS 44 fills an ANI AVP according to the time zone information in the PANI header and sends an ACR message including the ANI AVP to a CDF network element 45.

In this embodiment, the information of the time zone in which the UE 41 is located is included by extending the PANI header, corresponding to the ANI AVP in a charging message Diameter; if the information of the time zone in which the UE 41 is located is included by other methods, the AS 44 also can add the information of the time zone in which the UE 41 is located into a Diameter ACR message as a single AVP or extend the information of the time zone in which the UE 41 is located to an existing AVP in another ACR message to send to the CDF network element 45.

Step 610: after receiving the ACR message sent from the AS 44, the CDF network element 45 opens an AS CDR and sets, according to the time zone information in the ACR message, the time field of the AS CDR to contain valid information of local time of the UE 41, that is, UTC time of UE 41+time zone information.

Step 611: the SCSCF network element 43 sends a 200 OK response to the PCSCF network element 42.

Step 612: the SCSCF network element 43 fills an ANI AVP according to the time zone information in the PANI header and sends an ACR message including the ANI AVP to the CDF network element 45.

In this embodiment, the information of the time zone in which the UE 41 is located is included by extending the PANI header; if the information is included by other methods, the SCSCF network element 43 also can add the information of the time zone in which the UE 41 is located into a Diameter ACR message as a single AVP or extend the information of the time zone in which the UE 41 is located to an existing AVP in another ACR message to send to the CDF network element 45.

Step 613: after receiving the ACR message sent from the SCSCF network element 43, the CDF network element 45 opens an SCSCF CDR and sets, according to the time zone information in the ACR message, the time field of the SCSCF CDR to contain the valid information of local time of the UE 41.

Step 614: the PCSCF network element 42 sends a 200 OK response to the UE 41.

Step 615: the PCSCF network element 42 fills an ANI AVP according to the time zone information in the PANI header and sends an ACR message including the ANI AVP to the CDF network element 45.

In this embodiment, the information of the time zone in which the UE41 is located is included by extending the PANI header; if the information is included by other methods, the SCSCF network element 42 also can add the information of the time zone in which the UE 41 is located into a Diameter ACR message as a single AVP or extend the information of the time zone in which the UE 41 is located to an existing AVP in another ACR message to send to the CDF network element 45.

Step 616: after receiving the ACR message sent from the PCSCF network element 42, the CDF network element 45 opens a PCSCF CDR and sets, according to the time zone information in the ACR message, the time field of the PCSCF CDR to contain the valid information of local time of the UE 41.

Embodiment 3

Figure 10:
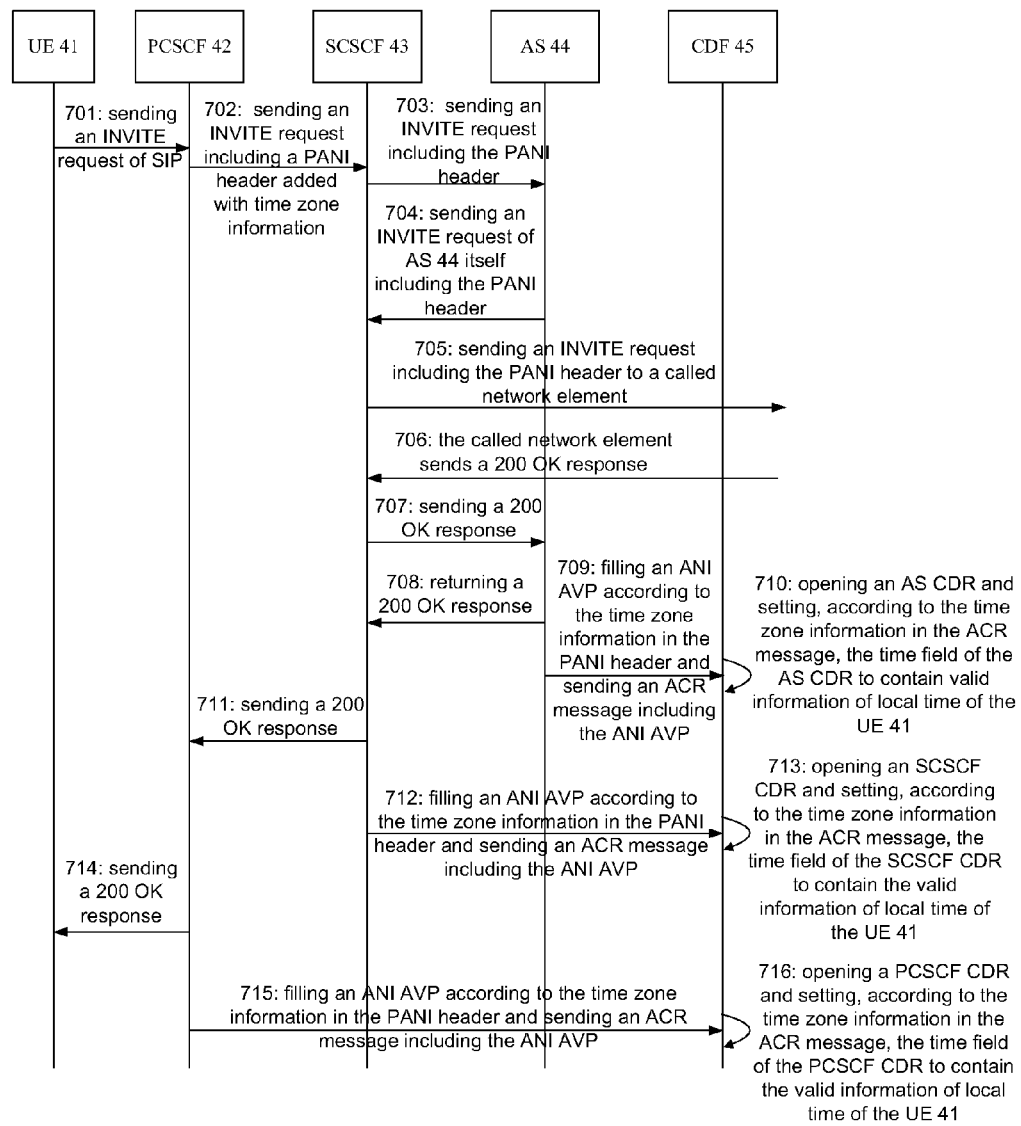
FIG. 10 shows a flowchart of a method for supporting multiple time zones and performing offline charging in an IMS when both UE41 and an access layer network element do not provide time zone information according to Embodiment 3 of the disclosure.

In the network architecture shown in FIG. 6 in this embodiment, when both a UE 41 and an access layer network element do not provide time zone information, a PCSCF network element 42 determines the time zone information of the UE 41 according to location information; then, a charging method in an IMS is implemented during offline charging; as shown in FIG. 10, the method includes the following steps:

Step 701: the UE 41 sends an INVITE request of SIP to the PCSCF network element 42.

Step 702: after receiving the INVITE request, the PCSCF network element 42 sends an INVITE request including a PANI header added with the time zone information to an SCSCF network element 43.

In this step, the PCSCF network element maps out information of the time zone in which the UE 41 is located in a configuration table of the PCSCF itself, according to location information of the UE 41 provided by the UE 41 or by the access layer network element, for example, Tracking Area (TA) or Cell ID, and adds the time zone information into the PANI header in the INVITE request sent to the SCSCF network element 43; the configuration table of the PCSCF network element refers to a table configurable by an operator for reflecting the mapping relationship between the location information of the UE and the information of the corresponding time zone in which the UE is located.

Step 703: after receiving the INVITE request including the PANI header sent from the PCSCF network element 42, the SCSCF network element 43 sends an INVITE request including the PANI header to a subscribed AS 44.

Step 704: after receiving the INVITE request including the PANI header sent from the SCSCF network element 43, the AS 44 sends an INVITE request of itself to the SCSCF network element 43, which includes the PANI header.

Step 705: the SCSCF network element 43 sends an INVITE request including the PANI header to a called network element.

Step 706: the called network element sends a 200 OK response to the SCSCF network element 43.

Step 707: the SCSCF network element 43 sends a 200 OK response to the AS 44.

Step 708: the AS 44 returns a 200 OK response to the SCSCF network element 43.

Step 709: the AS 44 fills an ANI AVP according to the time zone information in the PANI header and sends an ACR message including the ANI AVP to a CDF network element 45.

In this embodiment, the information of the time zone in which the UE 41 is located is included by extending the PANI header, corresponding to the ANI AVP in a charging message Diameter; if the information of the time zone in which the UE 41 is located is included by other methods, the AS 44 also can add the information of the time zone in which the UE 41 is located into a Diameter ACR message as a single AVP or extend the information of the time zone in which the UE 41 is located to an existing AVP in another ACR message to send to the CDF network element 45.

Step 710: after receiving the ACR message sent from the AS 44, the CDF network element 45 opens an AS CDR and sets, according to the time zone information in the ACR message, the time field of the AS CDR to contain valid information of local time of the UE 41, that is, UTC time of UE 41+time zone information.

Step 711: the SCSCF network element 43 sends a 200 OK response to the PCSCF network element 42.

Step 712: the SCSCF network element 43 fills an ANI AVP according to the time zone information in the PANI header and sends an ACR message including the ANI AVP to the CDF network element 45.

In this embodiment, the information of the time zone in which the UE 41 is located is included by extending the PANI header; if the information is included by other methods, the SCSCF network element 43 also can add the information of the time zone in which the UE 41 is located into a Diameter ACR message as a single AVP or extend the information of the time zone in which the UE 41 is located to an existing AVP in another ACR message to send to the CDF network element 45.

Step 713: after receiving the ACR message sent from the SCSCF network element 43, the CDF network element 45 opens an SCSCF CDR and sets, according to the time zone information in the ACR message, the time field of the SCSCF CDR to contain the valid information of local time of the UE 41.

Step 714: the PCSCF network element 42 sends a 200 OK response to the UE 41.

Step 715: the PCSCF network element 42 fills an ANI AVP according to the time zone information in the PANI header and sends an ACR message including the ANI AVP to the CDF network element 45.

In this embodiment, the information of the time zone in which the UE 41 is located is included by extending the PANI header; if the information is included by other methods, the SCSCF network element 42 also can add the information of the time zone in which the UE 41 is located into a Diameter ACR message as a single AVP or extend the information of the time zone in which the UE 41 is located to an existing AVP in another ACR message to send to the CDF network element 45.

Step 716: after receiving the ACR message sent from the PCSCF network element 42, the CDF network element 45 opens a PCSCF CDR and sets, according to the time zone information in the ACR message, the time field of the PCSCF CDR to contain the valid information of local time of the UE 41.

Embodiment 4

Figure 11:
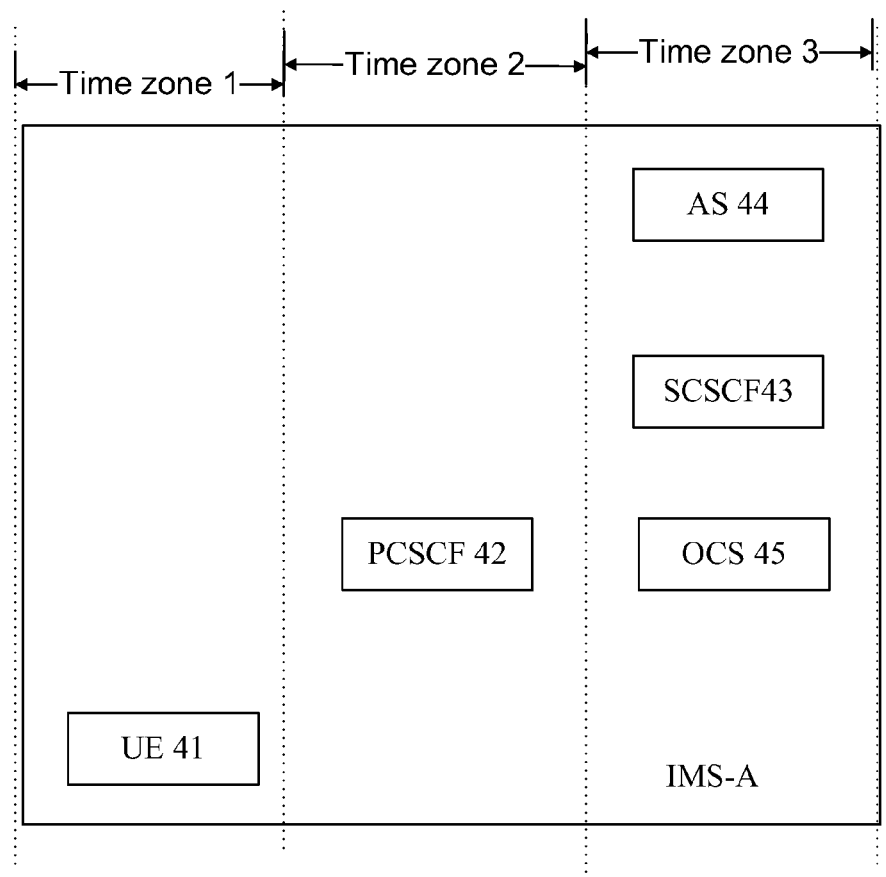
FIG. 11 shows a diagram of a network architecture for Embodiment 4 of the disclosure.
Figure 12:
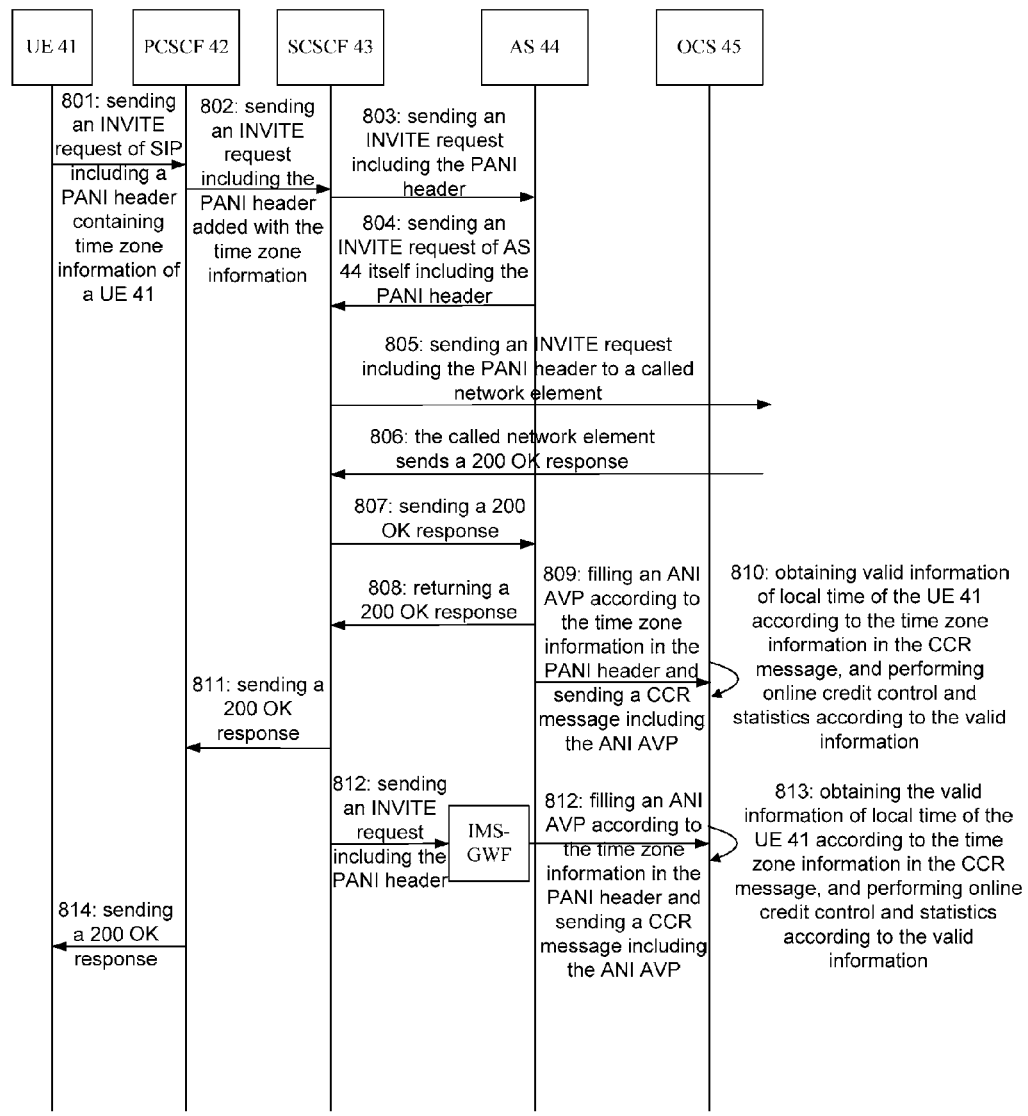
FIG. 12 shows a flowchart of a method for supporting multiple time zones and performing online charging in an IMS when a PCSCF network element trusts information reported from UE41 according to Embodiment 4 of the disclosure.

In this embodiment, a UE 41 reports time zone information, and a PCSCF network element trusts the information reported from the UE according to configuration; in the network architecture shown in FIG. 11, time zone 1≠time zone 2≠time zone 3; a charging method in an IMS is implemented during online charging when the time zone information is included by a calling side UE 41 (IMS-A) using the ANI method. As shown in FIG. 12, the method includes the following steps:

Step 801: the UE 41 sends an INVITE request of SIP to the PCSCF network element 42, including a PANI header containing the time zone information of the UE41.

Step 802: after receiving the INVITE request, the PCSCF network element 42 sends an INVITE request including the PANI header added with the time zone information to an SCSCF network element 43.

Specifically, after receiving the INVITE request, the PCSCF network element 42 trusts the time zone information reported from the UE 41 according to configuration, and passes through the PANI header added with the time zone information, that is, the PANI header added with the time zone information is included in the INVITE request sent to the SCSCF network element 43.

Step 803: after receiving the INVITE request including the PANI header sent from the SCSCF network element 42, the SCSCF network element 43 sends an INVITE request including the PANI header to a subscribed AS 44.

Step 804: after receiving the INVITE request including the PANI header sent from the SCSCF network element 43, the AS 44 sends an INVITE request of itself to the SCSCF network element 43, which includes the PANI header.

Step 805: the SCSCF network element 43 sends an INVITE request including the PANI header to a called network element.

Step 806: the called network element sends a 200 OK response to the SCSCF network element 43.

Step 807: the SCSCF network element 43 sends a 200 OK response to the AS 44.

Step 808: the AS 44 returns a 200 OK response to the SCSCF network element 43.

Step 809: the AS 44 fills an ANI AVP according to the time zone information in the PANI header and sends a CCR message including the ANI AVP to an OCS 45.

In this embodiment, the information of the time zone in which the UE 41 is located is included by extending the PANI header, corresponding to the ANI AVP in a charging message Diameter; if the information of the time zone in which the UE 41 is located is included by other methods, the AS 44 also can add the information of the time zone in which the UE 41 is located into a Diameter CCR message as a single AVP or extend the information of the time zone in which the UE 41 is located to an existing AVP in another CCR message to send to the OCS 45.

Step 810: the OCS 45 obtains valid information of local time of the UE 41 according to the time zone information in the CCR message, and performs online credit control and statistics according to the valid information.

Step 811: the SCSCF network element 43 sends a 200 OK response to the PCSCF network element 42.

Step 812: the SCSCF network element 43 sends an INVITE request including the PANI header to an IMS GWF network element, which then fills an ANI AVP according to the time zone information in the PANI header and sends a CCR message including the ANI AVP to the OCS 45.

In this embodiment, the information of the time zone in which the UE 41 is located is included by extending the PANI header, corresponding to the ANI AVP in a charging message Diameter; if the information of the time zone in which the UE 41 is located is included by other methods, the SCSCF network element 43 also can add the information of the time zone in which the UE 41 is located into a Diameter CCR message as a single AVP or extend the information of the time zone in which the UE 41 is located to an existing AVP in another CCR message to send to the OCS 45.

Step 813: the OCS 45 obtains the valid information of local time of the UE 41 according to the time zone information in the CCR message, and performs online credit control and statistics according to the valid information.

Step 814: the PCSCF network element 42 sends a 200 OK response to the UE 41.

The above embodiments all belong to the situation that a calling party initiates a session; the processing for the information of the time zone in which the UE is located in the calling process of other mobile stations is similar to the above embodiment, and no further description is needed here.

The above embodiments all transmit the time zone information by extending the PANI header; the time zone information also can be transmitted by another method of: transmitting the time zone information using a separate information field or by extending other fields.

Since there is probably only one time zone in some countries, that is, the core network is not deployed across time zones, for example, each country in European Union; in this condition, the inter-network transmission of the time zone information of the UE is optional according to the requirement of local operators.

Figure 13:
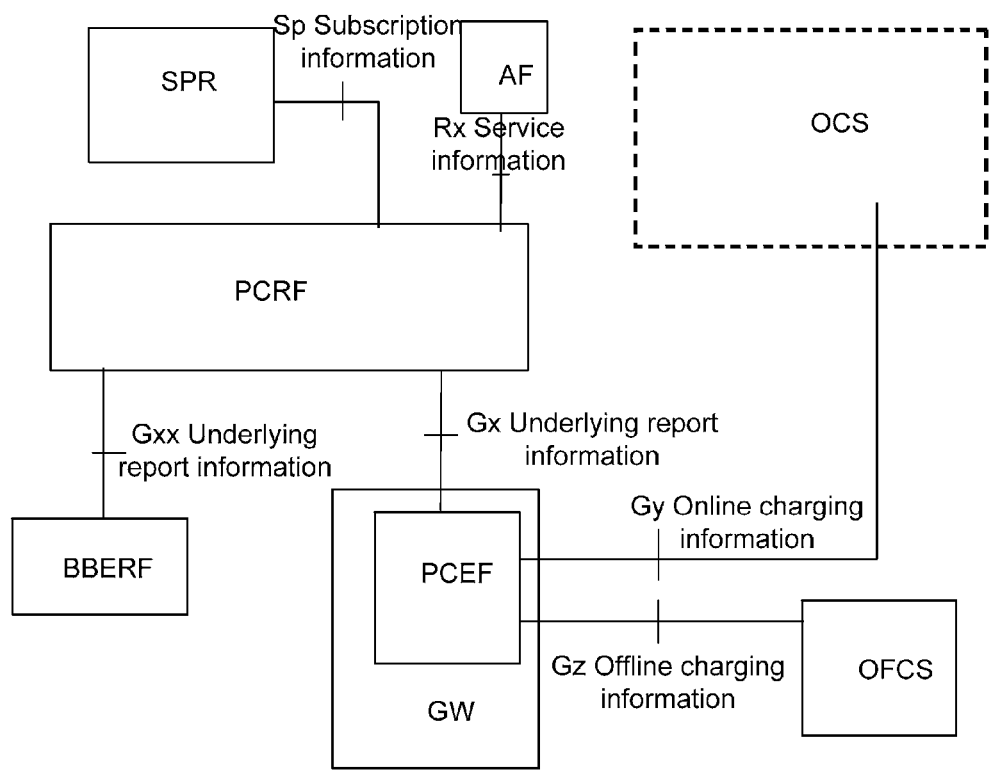
FIG. 13 shows a diagram of a PCC architecture defined in the 3GPP on which Embodiment 5 and Embodiment 6 are based.

Hereinafter, the process of the access layer network element providing time zone information to the PCSCF network element in Embodiment 2 is described in detail through Embodiment 5 and Embodiment 6; both Embodiment 5 and Embodiment 6 are based on the PCC architecture defined in the 3GPP shown in FIG. 13; a PCRF distributes a new policy to perform policy and charging control, according to subscription information of a Subscription Profile Repository (SPR), service information transmitted by an AF, and event information triggering change of charging policy and QoS reported from a Bearing Binding and Event Report Function (BBERF); a PCEF transmits online and offline messages through Gy and Gz interfaces, respectively.

Embodiment 5

Figure 14:
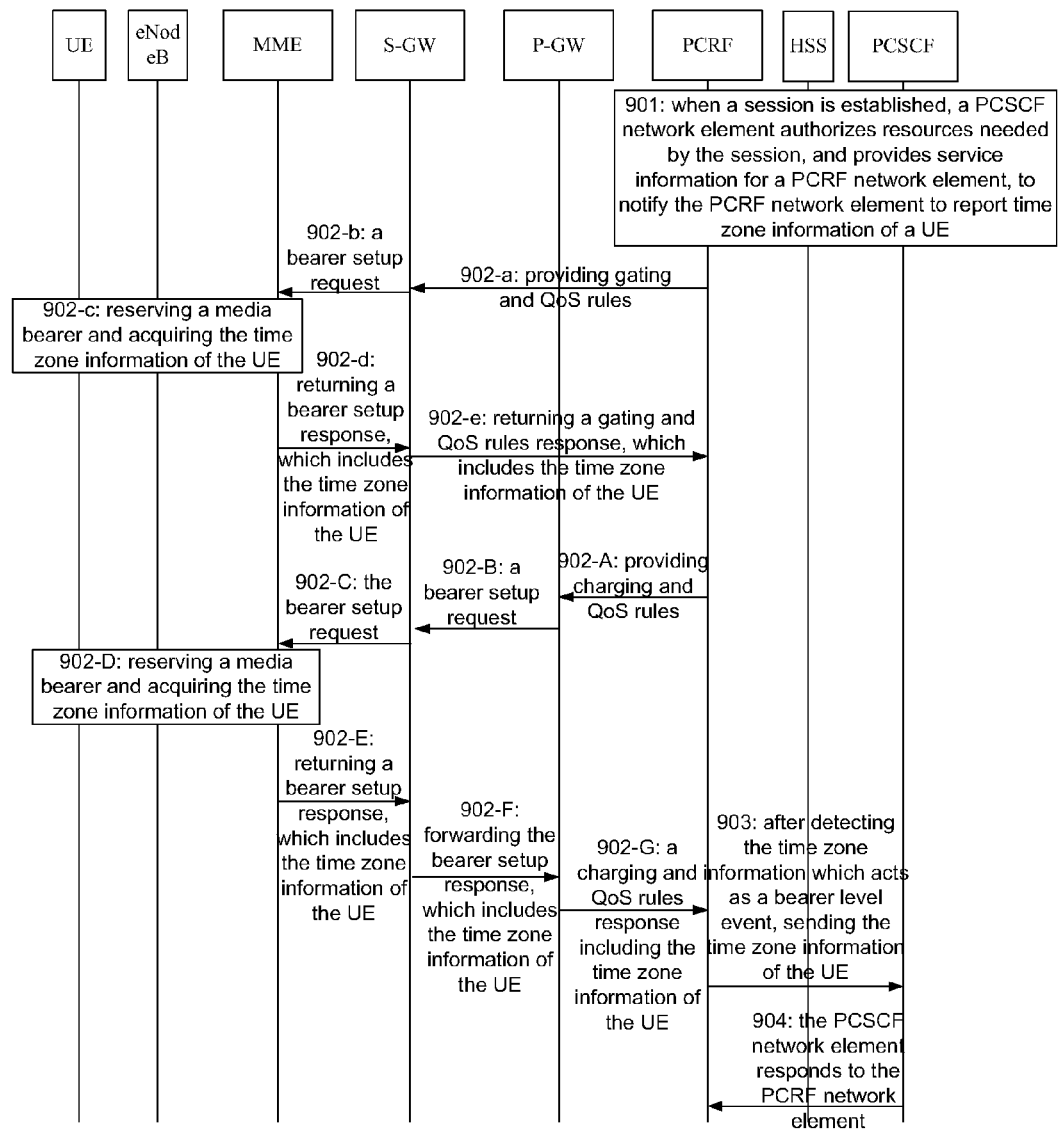
FIG. 14 shows a flowchart of a method for providing time zone information of a UE to a PCSCF network element by an access layer network element when a session is established according to Embodiment 5.

In this embodiment, when a session is established, a method for providing time zone information of a UE for a PCSCF network element through a PCC architecture by an access layer network element, as shown in FIG. 14, includes the following steps:

Step 901: when a session in an IMS is established, the PCSCF network element authorizes resources needed by the session, and provides service information for a PCRF network element, to notify the PCRF network element to report time zone information of a UE.

Step 902: when PMIP-S5/S8 protocol exists between a P-GW and an S-GW, the PCRF network element initiates a gating and QoS rules supply process and triggers the S-GW to allocate a dedicated bearer, and the S-GW adds the time zone information of the UE provided by an MME into a gating and QoS rules response; when GTP-S5/S8 protocol exists between the P-GW and the S-GW, the PCRF network element initiates a charging and QoS rules supply process and triggers the P-GW to allocate a dedicated bearer, and the P-GW adds the time zone information of the UE provided by the MME into a charging and QoS rules response.

Specifically, when PMIP-S5/S8 protocol exists between the P-GW and the S-GW, step 902 includes the following steps:

Step 902-*a*: the PCRF network element provides gating and QoS rules for the S-GW.

Step 902-*b*: the S-GW sends a bearer setup request to the MME.

Step 902-*c*: the MME reserves a media bearer and acquires the time zone information of the UE.

Step 902-*d*: the MME returns a bearer setup response to the S-GW, which includes the time zone information of the UE.

Step 902-*e*: the S-GW returns a gating and QoS rules response to the PCRF network element, which includes the time zone information of the UE.

When GTP-S5/S8 protocol exists between the P-GW and the S-GW, step 902 includes the following steps:

Step 902-A: the PCRF network element provides charging and QoS rules for the P-GW.

Step 902-B: the P-GW sends a bearer setup request to the S-GW.

Step 902-C: the S-GW forwards the bearer setup request to the MME.

Step 902-D: the MME reserves a media bearer and acquires the time zone information of the UE.

Step 902-E: the MME returns a bearer setup response to the S-GW, which includes the time zone information of the UE.

Step 902-F: the S-GW forwards the bearer setup response to the P-GW, which includes the time zone information of the UE.

Step 902-G: the P-GW returns a charging and QoS rules response to the PCRF network element, which includes the time zone information of the UE.

Step 903: after detecting the time zone information of the UE which acts as a bearer level event, the PCRF network element sends the time zone information of the UE to the PCSCF network element.

Step 904: the PCSCF network element responds to the PCRF network element.

Embodiment 6

Figure 15:
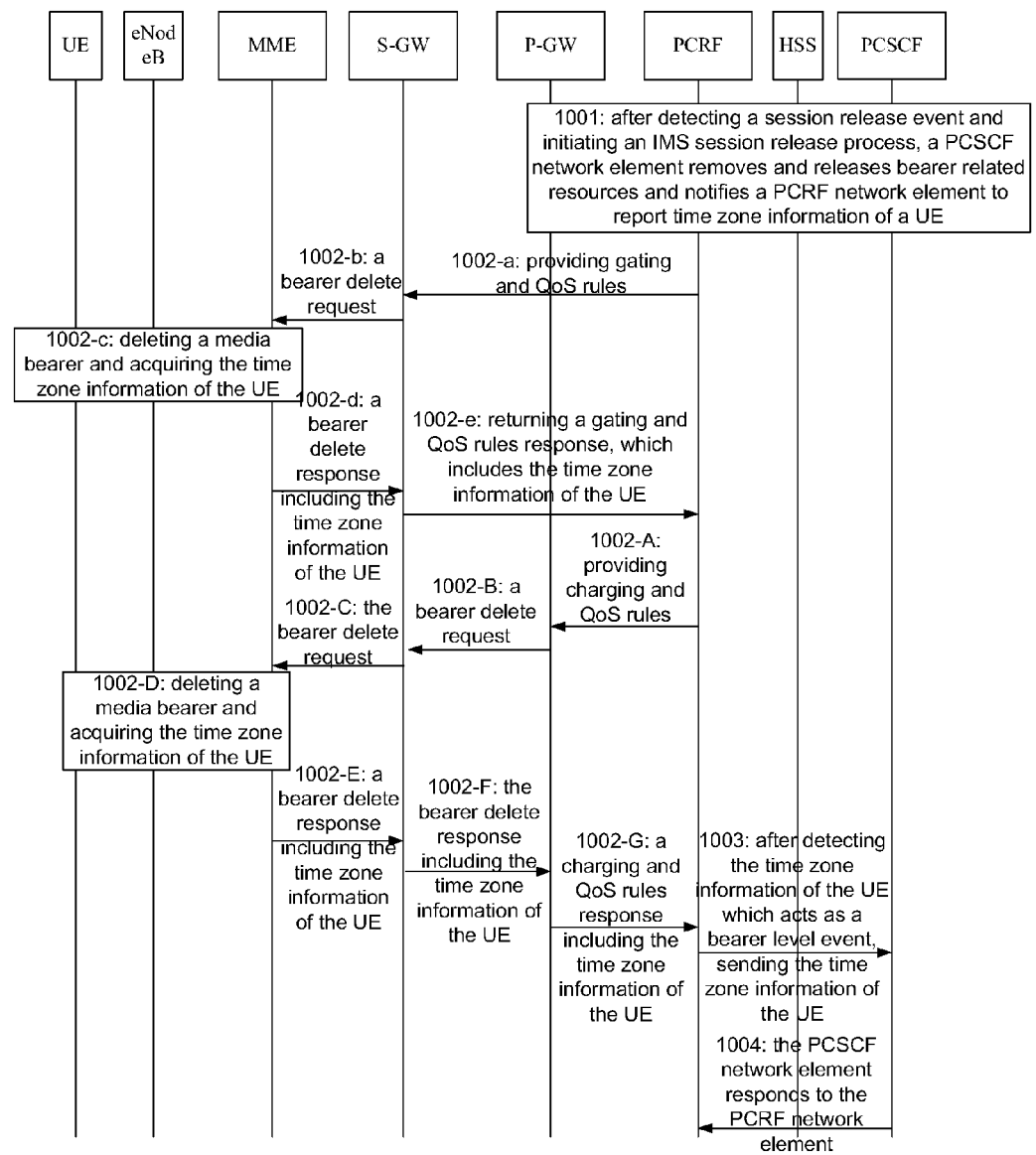
FIG. 15 shows a flowchart of a method for providing time zone information of a UE to a PCSCF network element by an access layer network element when a session is released according to Embodiment 6.

In this embodiment, when a session is released, a method for providing time zone information of a UE for a PCSCF network element through a PCC architecture by an access layer network element, as shown in FIG. 15, includes the following steps:

Step 1001: after the PCSCF network element detects a session release event and initiates an IMS session release process, the PCSCF network element removes and releases bearer related resources and notifies a PCRF network element to report the time zone information of the UE.

In this step, detecting the session release event may specifically include receiving an SIP BYE message.

Step 1002: when PMIP-S5/S8 protocol exists between a P-GW and an S-GW, the PCRF initiates a gating and QoS rules supply process and triggers the S-GW to deactivate a dedicated bearer, and the S-GW includes the time zone information of the UE provided by an MME in a gating and QoS rules response; when GTP-S5/S8 protocol exists between the P-GW and the S-GW, the PCRF initiates a charging and QoS rules supply process and triggers the P-GW to deactivate a dedicated bearer, and the P-GW adds the time zone information of the UE provided by the MME into a charging and QoS rules response.

Specifically, when PMIP-S5/S8 protocol exists between the P-GW and the S-GW, step 1002 includes the following steps:

Step 1002-*a:* the PCRF network element provides gating and QoS rules for the S-GW.

Step 1002-*b:* the S-GW sends a bearer delete request to the MME.

Step 1002-*c:* the MME deletes a media bearer and acquires the time zone information of the UE.

Step 1002-*d:* the MME returns a bearer delete response to the S-GW, which includes the time zone information of the UE.

Step 1002-*e:* the S-GW returns a gating and QoS rules response to the PCRF network element, which includes the time zone information of the UE.

When GTP-S5/S8 protocol exists between the P-GW and the S-GW, step 1002 includes the following steps:

Step 1002-A: the PCRF network element provides charging and QoS rules for the P-GW.

Step 1002-B: the P-GW sends a bearer delete request to the S-GW.

Step 1002-C: the S-GW forwards the bearer delete request to the MME.

Step 1002-D: the MME deletes a media bearer and acquires the time zone information of the UE.

Step 1002-E: the MME returns a bearer delete response to the S-GW, which includes the time zone information of the UE.

Step 1002-F: the S-GW forwards the bearer delete response to the P-GW, which includes the time zone information of the UE.

Step 1002-G: the P-GW returns a charging and QoS rules response to the PCRF network element, which includes the time zone information of the UE.

Step 1003: after detecting the time zone information of the UE which acts as a bearer level event, the PCRF network element sends the time zone information of the UE to the PCSCF network element.

Step 1004: the PCSCF network element responds to the PCRF network element.

It should be noted that, during the session process, the time zone information of the UE may change, and operators can set whether the change of the time zone information acts as a bearer level event to be notified to the PCSCF network element by the PCRF network element, according to their own requirements; if so, the PCRF network element notifies the change of the time zone information of the UE to the PCSCF network element when detecting the change of the time zone information, then the PCSCF network element sends an INFO message of SIP including the changed time zone information to control layer and service layer network elements exclusive of the PCSCF network element itself, and triggers the sending of a charging request message to a charging entity; the charging entity may record the changed time zone information in partial CDR. However, this could cause very high network signaling load, and the rate of change of time zone information in a session is very low, thus, most operators would not select to increase network load for such a low probability.

With the method provided by the disclosure, the time zone information can be transferred to each network element in the IMS, and local time of a user in a call can be included in a CDR, thus, the accuracy of charging is improved, the probability of user complaints is reduced and the revenue loss of operators is reduced.

The above are only the preferred embodiments of the disclosure and not intended to limit the scope of protection of the disclosure. Any modification, equivalent substitute and improvement made within the spirit and principle of the disclosure are deemed to be included within the scope of protection of the disclosure.

What is claimed is:

1. A method for supporting multiple time zones in an IP Multimedia Subsystem (IMS), comprising:
    sending, by a Proxy Call Session Control Function (PC-SCF) network element, a Session Initiation Protocol (SIP) message including time zone information to a control layer network element exclusive of the PCSCF network element;
    after obtaining the time zone information, sending, by the control layer network element receiving the SIP message, an SIP message including the time zone information to a service layer network element; and
    receiving, by the service layer network element, the SIP message sent from the control layer network element, and obtaining the time zone information included in the SIP message;
    wherein the sending, by a PCSCF network element, an SIP message including time zone information to a control layer network element exclusive of the PCSCF network element comprises:

in the condition that the PCSCF network element trusts information reported from a User Equipment (UE),
  when the UE reports time zone information, sending, by the PCSCF network element, an SIP message including the time zone information reported from the UE to the control layer network element exclusive of the PCSCF network element; and
  when the UE does not report time zone information and the access layer network element does not provide time zone information, determining, by the PCSCF network element, time zone information of the UE, and sending an SIP message including the determined time zone information to the control layer network element exclusive of the PCSCF network element;
  wherein, determining, by the PCSCF network element, time zone information of the UE, comprises: mapping out, by the PCSCF network element, the time zone information in which the UE is located in a configuration table of the PCSCF network element itself, according to location information of the UE provided by the UE or by the access layer network element.

2. The method according to claim 1, wherein the sending, by a PCSCF network element, an SIP message including time zone information to a control layer network element exclusive of the PCSCF network element comprises:
  in the condition that the PCSCF network element trusts information reported from a User Equipment (UE), when the UE does not report time zone information and an access layer network element provides time zone information, sending, by the PCSCF network element, an SIP message including the time zone information provided by the access layer network element to the control layer network element exclusive of the PCSCF network element;
  in the condition that the PCSCF network element does not trust information reported from the UE, when the access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element.

3. The method according to claim 2, wherein the including time zone information specifically comprises: adding the time zone information into a P-Access-Network-Info (PANI) header of the sent SIP message.

4. The method according to claim 2, wherein an access layer network element providing time zone information specifically comprises: when a session is established or released, reporting, by the access layer network element, obtained time zone information of the UE to the PCSCF network element through a Policy and Charging Control (PCC) architecture.

5. A system for supporting multiple time zones in an IP Multimedia Subsystem (IMS), comprising: a Proxy Call Session Control Function (PCSCF) network element, a control layer network element exclusive of the PCSCF network element, and a service layer network element; wherein
  the PCSCF network element is configured to send a Session Initiation Protocol (SIP message including time zone information to the control layer network element;
  the control layer network element is configured to receive the SIP message sent from the PCSCF network element and to send an SIP message including the time zone information to the service layer network element after obtaining the time zone information;
  the service layer network element is configured to receive the SIP message sent from the control layer network element and to obtain the time zone information included in the SIP message;
  wherein the PCSCF network element is specifically configured:
  in the condition that the PCSCF network element trusts information reported from a User Equipment (UE),
    when the UE reports time zone information, sending, by the PCSCF network element, an SIP message including the time zone information reported from the UE to the control layer network element exclusive of the PCSCF network element; and
    when the UE does not report time zone information and the access layer network element does not provide time zone information, determining, by the PCSCF network element, time zone information of the UE, and sending an SIP message including the determined time zone information to the control layer network element exclusive of the PCSCF network element;
    wherein, determining, by the PCSCF network element, time zone information of the UE, comprises: mapping out, by the PCSCF network element, the time zone information in which the UE is located in a configuration table of the PCSCF network element itself, according to location information of the UE provided by the UE or by the access layer network element.

6. The system according to claim 5, further comprising: a User Equipment (UE), which is configured to report time zone information to the PCSCF network element; and
  an access layer network element, which is configured to provide time zone information or location information of the UE to the PCSCF network element.

7. The system according to claim 6, wherein the PCSCF network element is specifically configured:
  in the condition that the PCSCF network element trusts information reported from the UE, when the UE does not report time zone information and the access layer network element provides time zone information, to send an SIP message including the time zone information provided by the access layer network element to the control layer network element exclusive of the PCSCF network element;
  in the condition that the PCSCF network element does not trust information reported from the UE, when the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element.

8. A charging method in an IP Multimedia Subsystem (IMS), comprising:
  sending, by a Proxy Call Session Control Function (PCSCF) network element, a Session Initiation Protocol (SIP) message including time zone information to a control layer network element exclusive of the PCSCF network element;

after obtaining the time zone information, sending, by the control layer network element receiving the SIP message, an SIP message including the time zone information to a service layer network element;

receiving, by the service layer network element, the SIP message sent from the control layer network element, and obtaining the time zone information included in the SIP message;

sending, by each network element obtaining the time zone information, a charging request message including the time zone information to a charging entity;

performing charging, by the charging entity, according to the charging request message including the time zone information sent from each network element;

wherein the sending, by a PCSCF network element, an SIP message including time zone information to a control layer network element exclusive of the PCSCF network element comprises:

in the condition that the PCSCF network element trusts information reported from a User Equipment (UE),
when the UE reports time zone information, sending, by the PCSCF network element, an SIP message including the time zone information reported from the UE to the control layer network element exclusive of the PCSCF network element; and
when the UE does not report time zone information and the access layer network element does not provide time zone information, determining, by the PCSCF network element, time zone information of the UE, and sending an SIP message including the determined time zone information to the control layer network element exclusive of the PCSCF network element; wherein, determining, by the PCSCF network element, time zone information of the UE, comprises: mapping out, by the PCSCF network element, the time zone information in which the UE is located in a configuration table of the PCSCF network element itself, according to location information of the UE provided by the UE or by the access layer network element.

9. The method according to claim 8, wherein the sending, by a PCSCF network element, an SIP message including time zone information to a control layer network element exclusive of the PCSCF network element comprises:

in the condition that the PCSCF network element trusts information reported from a User Equipment (UE), when the UE does not report time zone information and an access layer network element provides time zone information, sending, by the PCSCF network element, an SIP message including the time zone information provided by the access layer network element to the control layer network element exclusive of the PCSCF network element;

in the condition that the PCSCF network element does not trust information reported from the UE, when the access layer network element provides time zone information, sending, by the PCSCF network element, an SIP message including the time zone information provided by the access layer network element to the control layer network element exclusive of the PCSCF network element; when the access layer network element does not provide time zone information, determining, by the PCSCF network element, time zone information of the UE, and sending an SIP message including the determined time zone information to the control layer network element exclusive of the PCSCF network element.

10. The method according to claim 8, wherein the sending, by each network element obtaining the time zone information, a charging request message including the time zone information to a charging entity comprises: in an offline charging system, sending, by the service layer network element and the control layer network element including the PCSCF network element which obtain the time zone information, an Accounting Request (ACR) message including the time zone information to a Charging Data Function (CDF); in an online charging system, sending, by the service layer network element and the control layer network element exclusive of the PCSCF network element which obtain the time zone information, a Credit Control Request (CCR) including the time zone information to an Online Charging System (OCS).

11. The method according to claim 8, wherein the performing charging, by the charging entity, according to the charging request message including the time zone information sent from each network element comprises: in an offline charging system, obtaining, by the charging entity, the time zone information from the charging request message sent from each network element, and setting a time field of a Charging Data Record (CDR) corresponding to each network element to contain valid information of local time of the UE, that is, UTC Time of UE+Time Zone Information, in conjunction with SIP-Request-Timestamp Attribute Value Pairs (SIP-Request-Timestamp AVP) and SIP-Response-Timestamp AVP (SIP-Response-Timestamp AVP) of Universal Time Coordinated (UTC) time format; in an online charging system, obtaining, by the charging entity, valid information of local time of the UE according to the charging request message including the time zone information sent from each network element and performing online credit control and statistics according to the valid information.

12. A charging system in an IP Multimedia Subsystem (IMS), comprising: a Proxy Call Session Control Function (PCSCF) network element, a control layer network element exclusive of the PCSCF network element, a service layer network element and a charging entity; wherein the PCSCF network element is configured to send a Session Initiation Protocol (SIP) message including time zone information to the control layer network element and to send a charging request message including the time zone information to the charging entity in an offline charging system;

the control layer network element is configured to receive the SIP message sent from the PCSCF network element, to send an SIP message including the time zone information to the service layer network element after obtaining the time zone information, and to send a charging request message including the time zone information to the charging entity;

the service layer network element is configured to receive the SIP message sent from the control layer network element, to obtain the time zone information included in the SIP message, and to send a charging request message including the time zone information to the charging entity; and the charging entity is configured to perform charging according to the charging request message sent from each network element;

wherein the PCSCF network element is specifically configured:

in the condition that the PCSCF network element trusts information reported from a User Equipment (UE), when the UE reports time zone information, sending, by the PCSCF network element, an SIP message including the time zone information reported from the UE to the control layer network element exclusive of the PCSCF network element; and when the UE does not report time zone information and the access layer network element does not provide time zone information, determining, by the PCSCF network element, time zone information of the UE, and sending an SIP message including the determined time zone information to the control layer network element exclusive of the PCSCF network element; wherein, determining, by the PCSCF network element, time zone information of the UE, comprises: mapping out, by the PCSCF network element, the time zone information in which the UE is located in a configuration table of the PCSCF network element itself, according to location information of the UE provided by the UE or by the access layer network element.

13. The system according to claim 12, wherein the PCSCF network element is specifically configured:

in the condition that the PCSCF network element trusts information reported from a User Equipment (UE), when the UE does not report time zone information and the access layer network element provides time zone information, to send an SIP message including the time zone information provided by the access layer network element to the control layer network element exclusive of the PCSCF network element;

in the condition that the PCSCF network element does not trust information reported from the UE, when the access layer network element provides time zone information, to send an SIP message including the time zone information provided by the access layer network element to the control layer network element exclusive of the PCSCF network element; when the access layer network element does not provide time zone information, to determine time zone information of the UE, and to send an SIP message including the determined time zone information to the control layer network element exclusive of the PCSCF network element.

14. The system according to claim 12, wherein the charging entity comprises: a Charging Data Function (CDF) in an offline charging system, or an Online Charging System (OCS) in an online charging system;

the charging request message comprises an Accounting Request (ACR) message in the offline charging system or a Credit Control Request (CCR) message in the online charging system.

* * * * *